(12) United States Patent
Saemann et al.

(10) Patent No.: US 12,148,940 B2
(45) Date of Patent: Nov. 19, 2024

(54) STRUCTURE FOR A BATTERY PACK FOR SUPPLYING AN ELECTRICALLY DRIVEN WORK APPLIANCE WITH ELECTRICAL DRIVE POWER, BATTERY PACK, WORK SYSTEM AND METHOD FOR PRODUCING A BATTERY PACK

(71) Applicant: Andreas Stihl AG & Co. KG, Waiblingen (DE)

(72) Inventors: Christian Saemann, Stuttgart (DE); Florian Schumayer, Weilheim an der Teck (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 547 days.

(21) Appl. No.: 17/449,274

(22) Filed: Sep. 29, 2021

(65) Prior Publication Data

US 2022/0102801 A1    Mar. 31, 2022

(30) Foreign Application Priority Data

Sep. 30, 2020 (EP) .................................... 20199270

(51) Int. Cl.
*H01M 50/213* (2021.01)
*H01M 50/24* (2021.01)
(Continued)

(52) U.S. Cl.
CPC ......... *H01M 50/213* (2021.01); *H01M 50/24* (2021.01); *H01M 50/242* (2021.01);
(Continued)

(58) Field of Classification Search
None
See application file for complete search history.

(56) References Cited

U.S. PATENT DOCUMENTS

| 6,111,387 A * | 8/2000 | Kouzu | ................ | H01M 10/613 |
| | | | | 429/99 |
| 2010/0183905 A1* | 7/2010 | Matthias | ............. | H01M 50/503 |
| | | | | 429/97 |

(Continued)

FOREIGN PATENT DOCUMENTS

DE    10 2013 211 459 A1    12/2014
DE    10 2014 209 444 A1    11/2015
(Continued)

OTHER PUBLICATIONS

Machine Translation of WO 2019163549A (Year: 2019).*

(Continued)

*Primary Examiner* — Gregg Cantelmo
(74) *Attorney, Agent, or Firm* — Crowell & Moring LLP

(57) ABSTRACT

A structure for a battery pack for supplying an electrically driven work appliance with electrical drive power has a number of cell holder parts. The number of cell holder parts is designed for holding battery cells. At least two cell holder parts are designed for arrangement together in a holding arrangement and, in the holding arrangement, for jointly holding the battery cells. The cell holder parts, in the holding arrangement, jointly form at least a predominant part of a filling mould. The filling mould is designed for filling with a protective material for enclosing at least a part of a battery pack electronics unit. Additionally or alternatively, the structure has at least one cast assembly, wherein the cast assembly unites one of the number of cell holder parts and at least one casted-in cell contactor. The cell contactor is designed for contacting at least one cell terminal of at least one of the held battery cells.

17 Claims, 4 Drawing Sheets

(51) Int. Cl.
  *H01M 50/242* (2021.01)
  *H01M 50/247* (2021.01)
  *H01M 50/284* (2021.01)
  *H01M 50/507* (2021.01)
  *H01M 50/514* (2021.01)
  *H01M 50/519* (2021.01)
  *H01M 50/528* (2021.01)

(52) U.S. Cl.
  CPC ....... *H01M 50/247* (2021.01); *H01M 50/284* (2021.01); *H01M 50/507* (2021.01); *H01M 50/514* (2021.01); *H01M 50/519* (2021.01); *H01M 50/528* (2021.01); *H01M 2220/30* (2013.01)

(56) References Cited

U.S. PATENT DOCUMENTS

| | | |
|---|---|---|
| 2014/0050962 A1 | 2/2014 | Justinski |
| 2014/0377622 A1 | 12/2014 | Glauning |
| 2015/0207117 A1 | 7/2015 | Cho et al. |
| 2017/0301905 A1 | 10/2017 | Takeda et al. |
| 2020/0220232 A1 | 7/2020 | Von Hofen et al. |
| 2020/0335740 A1 | 10/2020 | Stanger et al. |
| 2020/0358070 A1 | 11/2020 | Kolb |

FOREIGN PATENT DOCUMENTS

| | | | |
|---|---|---|---|
| EP | 3 736 876 A1 | 11/2020 | |
| WO | WO-2017110036 A1 * | 6/2017 | |
| WO | WO 2019/120815 A1 | 6/2019 | |
| WO | WO-2019163549 A1 * | 8/2019 | ........ H01M 10/0525 |

OTHER PUBLICATIONS

Machine Translation of WO-2017110036-A1 (Year: 2017).*
German-language European Search Report issued in German Application No. 20199270.8 dated Jun. 10, 2021 with English translation (nine (9) pages).

* cited by examiner

STRUCTURE FOR A BATTERY PACK FOR SUPPLYING AN ELECTRICALLY DRIVEN WORK APPLIANCE WITH ELECTRICAL DRIVE POWER, BATTERY PACK, WORK SYSTEM AND METHOD FOR PRODUCING A BATTERY PACK

FIELD OF APPLICATION AND PRIOR ART

The invention relates to a structure for a battery pack for supplying an electrically driven work appliance with electrical drive power, to a battery pack, which has such a structure, for supplying an electrically driven work appliance with electrical drive power, to a work system having such a battery pack and an electrically driven work appliance, and to a method for producing such a battery pack.

Problem and Solution

It is the object of the invention to provide a structure for a battery pack for supplying an electrically driven work appliance with electrical drive power, a battery pack, which has such a structure, for supplying an electrically driven work appliance with electrical drive power, a work system having such a battery pack and an electrically driven work appliance, and a method for producing such a battery pack, wherein the method and the structure and thus the battery pack and thus the work system each have improved characteristics.

The invention achieves the object through the provision of a structure, a battery pack, a work system, and a method, having the features of the independent claims. Advantageous developments and/or refinements of the invention are described in the dependent claims.

The structure according to the invention is designed or configured for a battery pack for supplying an electrically driven work appliance, in particular a gardening, forestry and/or construction work appliance, or an electrical tool, with electrical drive power. The structure comprises or has a number of cell holder parts. The number of cell holder parts is designed or configured for in particular directly holding or fixing battery cells, in particular by physical contact.

Additionally, the number of cell holder parts comprises or has at least, in particular exactly, two cell holder parts. At least two of the, in particular the, in particular both, cell holder parts are designed or configured for arrangement together, in particular against one another, in particular in physical contact with one another, in a holding arrangement or holding position and, in the holding arrangement, for jointly or together holding the battery cells. The, in particular both, cell holder parts form or define, in the holding arrangement, in particular only, jointly or together, at least a predominant part of a filling mould, in particular the entirety of the filling mould, or of a filling cup or of a filling trough, in particular of an inner surface of the filling mould. The filling mould is designed or configured for filling with a protective material for enclosing at least a part of a battery pack electronics unit, in particular on all sides, and/or the entire battery pack electronics unit.

Additionally or alternatively, the structure comprises or has at least one in particular integral cast assembly or a cast prefabricated part. The cast assembly unites one of the number of cell holder parts and at least one in particular electrically conductive cell contactor which is casted in, in particular on all sides. The cell contactor is designed or configured for in particular directly contacting at least one in particular electrical cell terminal or a cell pole of at least one of the held battery cells, in particular by physical contact.

This, in particular the formation of the filling mould at least predominantly by means of the cell holder parts in the holding arrangement jointly, makes possible a synergistic effect and thus a saving effect and/or simple and/or fast production and assembly of the battery pack.

Additionally or alternatively, this, in particular the cast assembly uniting one of the number of cell holder parts and the at least one cast cell contactor, allows production of the cast assembly in particular only in one, in particular single production step, in particular casting step, and/or an avoidance of faults and/or, in particular thus, simple and/or fast production of the battery pack, in particular by contrast to a construction with a wiring harness having at least one cell contactor.

In particular, the number of cell holder parts may be designed to hold identical battery cells, in particular battery cells of the same type and/or construction. Additionally or alternatively, the number of cell holder parts may have in particular the at least two cell holder parts. At least two of the, in particular the, cell holder parts are designed for arrangement together in a, in particular the, holding arrangement and, in the holding arrangement, for jointly holding the battery cells. Further additionally or alternatively, at a time prior to an arrangement of the cell holder parts together in the holding arrangement, the cell holder parts may be removed from or spaced apart from one another for the purposes of receiving or being equipped with the battery cells, in particular between the cell holder parts. Further additionally or alternatively, the structure may have a multiplicity of cell holder parts, wherein the multiplicity of cell holder parts may be designed for holding the battery cells.

The cell holder parts not in the holding arrangement, and/or in each case on their own or removed from one another, do not need to, or may not, form at least the predominant part of the filling mould. Additionally or alternatively, a predominant part may mean at least 70 percent (%), in particular at least 80%, in particular at least 90%. Further additionally or alternatively, the cell holder parts may each have or define at least a part of a mould base and/or of a mould side wall of the filling mould. Further additionally or alternatively, the filling mould may be designed for receiving at least a part, in particular the at least one part, of the battery pack electronics unit, in particular the entire battery pack electronics unit, and in particular for filling with the protective material for the purposes of enclosing the at least one part of the received battery pack electronics unit. Further additionally or alternatively, a part may mean at least 25%, in particular at least 50%, in particular at least 75%. Further additionally or alternatively, the filling mould may be a filling cup or a filling trough and/or a casting mould or a casting cup or a potting cup or a potting trough and/or designed for the casting of the protective material in the form of a potting compound and/or for filling with the protective material in the form of a protective lacquer and/or a protective foam. Further additionally or alternatively, the filling mould may be sealed or impermeable with respect to the protective material in the direction of the in particular held battery cells, in particular by way of the physical contact of the cell holder parts with one another at least, in particular only, in the region of the filling mould. This can make it possible that the filled protective material cannot escape from the filling mould. Further additionally or alternatively, the filling mould may be open in an opposite direction or away from the in particular held battery cells and/or outward, in particular for the purposes of receiving at least the part of the battery pack electronics unit and/or for the purposes of filling with the protective material.

The cast assembly may have an in particular integral cast element, wherein the cast element may have the cell holder part and may enclose the cell contactor, in particular on all sides. In particular, the cell contactor may, in particular on all sides, be in the form of the cast element and/or casted-in by or by way of or by means of the cast element. Additionally or alternatively, the cast assembly, in particular the cast element, may be pre-cast. Further additionally or alternatively, the cast assembly, in particular the cast element, may be produced, in particular cast, in particular only in one, in particular single production step, in particular casting step. Further additionally or alternatively, the cast assembly, in particular the cast element, may be designed for arrangement in the holding arrangement. Further additionally or alternatively, the cell holder part, in particular the cast element, may be electrically insulating. Further additionally or alternatively, the contacting may be electrical and in particular mechanical. Further additionally or alternatively, the cell contactor may be designed for in particular directly electrically connecting at least two cell terminals of at least two of the held battery cells to one another.

In one refinement of the invention, the cell holder parts are designed or configured for arrangement in an arrangement direction and for holding elongate or prolate battery cells with in particular respective cell longitudinal axes non-orthogonally, in particular parallel, with respect to the arrangement direction. This allows easy receiving of or equipping with the battery cells, in particular between the cell holder parts, in particular at a time prior to the arrangement, and/or a compactness of the structure, in particular of the battery pack. In particular, an in particular respective length of the battery cells may be greater than an in particular respective diameter of the battery cells. Additionally or alternatively, the cell holder parts may in particular each be designed for holding the in particular elongate battery cells in the region of an in particular respective end side of the in particular elongate battery cells. Further additionally or alternatively, the at least one cell terminal may be arranged at at least one end side of the in particular elongate battery cell.

In one refinement of the invention, the cell holder parts are designed or configured for arrangement in a, in particular the, arrangement direction. The filling mould is designed or configured for receiving at least a part, in particular the at least one part, of the battery pack electronics unit, in particular the entire battery pack electronics unit, and for filling with, in particular for the casting of, the protective material, in particular in the form of the potting compound, in particular from the outside, in a receiving and filling direction, in particular receiving and casting direction, which is non-parallel, in particular orthogonal, with respect to the arrangement direction. In other words: the filling mould may be arranged or oriented with a receiving and filling opening, for receiving the at least one part of the battery pack electronics unit and for filling with the protective material, in the receiving and filling direction which is non-parallel, in particular orthogonal, with respect to the arrangement direction. This makes it possible that the receiving and/or the filling can be straightforward, in particular do(es) not need to, or may not, be carried out blind, and/or allows a compactness of the structure, in particular of the battery pack.

In one refinement of the invention, the cell holder parts are designed or configured for arrangement in a, in particular the, arrangement direction. The filling mould is designed or configured for receiving at least a part, in particular the at least one part, of the battery pack electronics unit, in particular the entire battery pack electronics unit, having or comprising at least one circuit board with a board plane non-orthogonal, in particular parallel, with respect to the arrangement direction. Additionally or alternatively, the filling mould is designed or configured for receiving at least a part, in particular the at least one part, of the battery pack electronics unit, in particular the entire battery pack electronics unit, having or comprising at least one, in particular the at least one, circuit board with a, in particular the, board plane non-orthogonal, in particular parallel, with respect to a side, in particular a peripheral side, in particular on the side, of at least one of the cell holder parts. This allows a compactness of the structure, in particular of the battery pack.

In one refinement of the invention, at least one of the cell holder parts, in particular the cast assembly, has or comprises in particular in each case one contacting side or one terminal side for a, in particular the, contacting of at least one, in particular of the at least one and/or electrical, cell terminal of at least one, in particular of the at least one, of the held battery cells, in particular by means of a, in particular the, cell contactor. The cell holder parts jointly have or comprise, in particular in the holding arrangement, at least one, in particular the, peripheral side which differs, in particular is averted, from the contacting side. The filling mould is in particular entirely arranged in particular only at the peripheral side. This allows a compactness of the structure, in particular of the battery pack, and/or accessibility to the cell contactor, if present. In particular, the cell holder parts in the holding arrangement jointly may be cuboidal. In particular, the contacting side and the peripheral side may in particular each be cuboid sides. Additionally or alternatively, the peripheral side may be an outer side.

In particular, the cell contactor may be designed for contacting the at least one cell terminal of the at least one of the held battery cells by means of a non-positively locking connection.

In one refinement of the invention, the cast assembly comprises or has an in particular integral and/or the casting element. The casting element comprises or has the cell holder part and encloses the cell contactor, in particular on all sides, and comprises or has at least one cutout, in particular a window or a through hole. The cutout leaves free, in particular accessible, a part of an outer side and a part of an inner side, which is situated opposite the outer side, of the cell contactor for the purposes of producing a cohesive connection, in particular a welded connection, to the cell terminal for the contacting of the cell terminal. This allows the cohesive connection to be produced from the outside through the cell contactor, and thus particularly straightforward and/or fast production and assembly of the battery pack.

In one refinement of the invention, the cast assembly comprises or has at least one electrical line which is casted in, in particular on all sides. The line is designed or configured for electrically connecting the cell contactor to a, in particular the, battery pack electronics unit. This allows fault avoidance and/or, in particular thus, simple and/or fast production of the battery pack, in particular by contrast to a battery pack with a wiring harness having at least one cell contactor, and/or electrical insulation of the line. In particular, the line may be a measurement line, in particular for measurement electronics of the battery pack electronics unit, or a power line, in particular for power electronics of the battery pack electronics unit.

In one refinement of the invention, the cell contactor is in particular entirely arranged in particular only on a, in particular the, contacting side of the cell holder part. The line runs at least in certain sections, in particular entirely and/or only, along a peripheral side, which differs, in particular is averted, from the contacting side, of the cell holder part. This allows a spatial separation of the line from at least one further cell contactor and/or from at least one further line, if present, and/or, in particular thus, a reduction of EMC fault susceptibility.

In one refinement, in particular one embodiment, of the invention, the cell contactor is rigid or inflexible, and in particular the cell contactor comprises or has a metal sheet, in particular is the metal sheet. Additionally or alternatively, the line, if present, is rigid or inflexible, and in particular the line comprises or has a metal sheet, in particular is the metal sheet. This makes it possible that the contacting and/or the connecting, in particular by means of a cohesive connection, in particular a soldered connection, can be straightforward, in particular by contrast to a construction with a wiring harness having at least one flexible cell contactor and/or a flexible line.

In one refinement of the invention, the cast assembly unites at least one in particular electrically conductive pack contactor which is casted in, in particular on all sides. The pack contactor is designed or configured for in particular directly contacting at least one in particular electrical appliance contactor of the work appliance, in particular by physical contact. This allows particularly good production of the cast assembly and/or particularly good fault avoidance and/or, in particular thus, particularly simple and/or fast production of the battery pack. In particular, the cast element, if present, may enclose the pack contactor, in particular on all sides. Additionally or alternatively, the contacting may be electrical and in particular mechanical. Further additionally or alternatively, the pack contactor may be for electrical connection to a, in particular the, battery pack electronics unit.

In one refinement of the invention, the cast assembly comprises or has an in particular integral and/or the casting element. The cast element comprises or has the cell holder part and encloses the cell contactor, in particular on all sides, and is in itself inter face-free. This allows production of the cast element in particular only in one, in particular single production step, in particular casting step, and/or, in particular thus, simple and/or fast production of the battery pack.

In one refinement of the invention, the cast assembly is an injection-moulded assembly or an injection-moulded prefabricated part, and in particular the cast element is an injection-moulded element. The cell contactor is injection-moulded in particular on all sides, in particular in the form of the injection-moulded element. This allows particularly simple and/or particularly fast production of the cast assembly and/or, in particular thus, particularly simple and/or particularly fast production of the battery pack.

The battery pack according to the invention is designed or configured for in particular automatically supplying a, in particular the, electrically driven work appliance with electrical drive power. The battery pack comprises or has a, in particular the, structure as described above and, in particular the, battery cells. The battery cells are held by means of the number of cell holder parts.

Additionally, the structure comprises or has a, in particular the, battery pack electronics unit and a, in particular the, protective material. The protective material is filled into the filling mould formed at least predominantly by means of the cell holder parts in the holding arrangement jointly. The filled protective material encloses at least one, in particular the at least one, part of the battery pack electronics unit, in particular on all sides, and/or the entire battery pack electronics unit.

Additionally or alternatively, at least one, in particular the at least one, cell terminal of at least one, in particular of the at least one, of the held battery cells is contacted by means of the casted-in cell contactor of the cast assembly uniting one of the number of cell holder parts and the at least one casted-in cell contactor.

In particular, the battery cells may be designed for supplying the work appliance with the drive power. Additionally or alternatively, the battery cells may each be electrochemical-based individually rechargeable storage elements for electrical energy. In particular, the battery cells may be lithium-ion battery cells. Further additionally or alternatively, the battery cells may be electrically interconnected, in particular connected in parallel or in series, in particular by means of at least one, in particular the at least one, cell contactor. In particular, the cell terminals in particular in each case of immediately adjacent battery cells may be, in particular directly, electrically connected to one another. Further additionally or alternatively, the battery cells may be identical, in particular of the same type and/or construction. Further additionally or alternatively, the battery cells may be round cells or prismatic cells. Further additionally or alternatively, the battery cells may be held by means of the cell holder parts in the holding arrangement jointly.

The protective material may be designed for protection against moisture, dust, foreign bodies, water and/or physical contact and/or for electrical insulation, that is to say for increasing the dielectric strength, and/or for heat dissipation and/or for fixing of parts to one another or for increasing the mechanical stability and/or for vibration and shock resistance, in particular of the enclosed part, of the battery pack electronics unit. In other words: the protective material may be electrically insulating and/or thermally conductive. Additionally or alternatively, the protective material in the form of the potting compound may be a cast resin, in particular a synthetic resin. Further additionally or alternatively, the protective material may be in a solid state, in particular cured. Further additionally or alternatively, at least one, in particular the at least one, part of the battery pack electronics unit, in particular the entire battery pack electronics unit, may be received in the filling mould, and in particular the filled protective material may enclose the at least one part of the received battery pack electronics unit.

Further additionally or alternatively, the cast assembly, in particular the cast element, may be arranged in the holding arrangement.

The battery pack, in particular the battery cells, may have a maximum electrical drive power of at least 10 watts (W), in particular of at least 100 W, in particular of at least 1 kilowatts (kW), in particular of at least 2 kW, and/or of at most 10 kW, in particular of at most 5 kW, in particular of 3 kW. Additionally or alternatively, the battery pack, in particular the battery cells, may have a nominal voltage of at least 1 volt (V), in particular of at least 2 V, in particular of at least 5 V, in particular of at least 10 V, in particular of at least 20 V, and/or of at most 100 V, in particular of at most 50 V, in particular of 36 V. Further additionally or alternatively, the battery pack, in particular the battery cells, may have an in particular electrical maximum energy content of at least 100 watt hours (Wh), in particular of at least 200 Wh, and/or of at most 4000 Wh, in particular of at most 2000 Wh, in particular of at most 1000 Wh, in particular of at most 500 Wh, in particular of 337 Wh.

In one refinement of the invention, the battery pack electronics unit comprises or has a, in particular the, measurement, power, user interface and/or transmission electronics unit, in particular is the measurement, power, user interface and/or transmission electronics unit. In particular, the measurement electronics unit may be designed for in particular automatically measuring characteristics, in particular voltages, in particular mean voltages, in particular of all, of the battery cells. This can make it possible for safety-critical states of the battery cells to be detected. Additionally or alternatively, the power electronics may be designed for in particular automatically controlling, in particular ending, the outputting of the electrical drive power from the battery pack and/or an intake of electrical charge power by the battery pack, in particular in a manner dependent on the measured characteristics. This can make it possible for safety-critical states of the battery cells and thus of the battery pack to be minimized or even avoided entirely. Further additionally or alternatively, the user interface electronics unit may be designed for in particular automatically interacting with a user, in particular for the purposes of outputting a state of charge of the battery pack. Further additionally or alternatively, the transmission electronics unit may be designed for in particular automatic wireless transmission of at least one operating parameter and/or operating state.

The work system according to the invention, in particular gardening, forestry and/or construction work system, comprises or has a, in particular the, battery pack as described above and an electrically driven, in particular the electrically driven, work appliance. The battery pack and the work appliance are designed or configured for electrical connection to one another for the purposes of in particular automatically supplying the work appliance with electrical drive power from the battery pack.

In particular, the work appliance may be a hand-guided, in particular ground-guided or hand-held work appliance. Hand-guided, in particular hand-held work appliance may in particular mean that the work appliance may have a mass of at most 50 kilograms (kg), in particular of at most 20 kg, in particular of at most 10 kg, in particular of at most 5 kg, and/or of at least 1 kg, in particular of at least 2 kg. Additionally or alternatively, the work appliance may have an electric drive motor. Further additionally or alternatively, the battery pack and the work appliance may be designed for electrical connection to one another in a manner releasable in particular without the use of tools and/or non-destructively, in particular by means of plug connectors. Further additionally or alternatively, the battery pack and the work appliance may be designed for mechanical connection to one another in a manner releasable in particular without the use of tools and/or non-destructively. In particular, the work appliance may be designed for carrying the battery pack. In particular, the work appliance may have a battery receptacle, in particular a battery slot, wherein the battery receptacle may be designed for receiving the battery pack. Alternatively, the battery pack may be integrated into the work appliance. Further additionally or alternatively, the battery pack and the work appliance may be designed for electrical connection to one another by mutual contacting of the at least one pack contactor and of the in particular at least one appliance contactor.

The method according to the invention is designed or configured or provided for the production or assembly of a, in particular the, battery pack as described above.

Additionally, the method comprises or has the steps: arranging the cell holder parts together in the holding arrangement for jointly holding the battery cells, and, in particular at a later point in time, filling the protective material into the filling mould, at least predominantly formed by means of the cell holder parts in the holding arrangement jointly, in order to enclose at least the part of the battery pack electronics unit.

Additionally or alternatively, the method comprises or has the steps: producing the at least one cast assembly, in particular at a later point in time or at a time after the ending of the production, in particular holding the battery cells by means of the number of cell holder parts, and, in particular at a later point in time, contacting the at least one cell terminal of the at least one of the held battery cells by means of the casted-in cell contactor of the cast assembly uniting one of the number of cell holder parts and the at least one casted-in cell contactor.

In particular, the method may comprise: arranging the cell holder parts together in the holding arrangement for jointly holding the battery cells.

The method may have: in particular at a time before an arrangement of the cell holder parts together in the holding arrangement, receiving the battery cells in the cell holder parts or equipping the cell holder parts with the battery cells.

The method may comprise: receiving at least the part of the battery pack electronics unit in the filling mould, and in particular, in particular at a later point in time, filling the protective material into the filling mould in order to enclose the at least one part of the received battery pack electronics unit.

The production of the at least one cast assembly may comprise: providing the at least one cell contactor, which is in particular to be casted in, in particular at a later point in time, casting, in particular injection moulding, the cast assembly uniting one of the number of cell holder parts and the at least one, in particular provided and/or then casted-in cell contactor, in particular the cast element, by means of casting of the cell holder part and encapsulation of the provided cell contactor with casting compound in a flowable, in particular liquid or plastic or plastically deformable state, and, in particular at a later point in time or at a time after the ending of the casting, curing the casting compound into a solid state.

The method may comprise: arranging the cast assembly, in particular the cast element, in the holding arrangement.

BRIEF DESCRIPTION OF THE DRAWINGS

Further advantages and aspects of the invention become apparent from the claims and from the following description of preferred exemplary embodiments of the invention, which are explained below with reference to the figures.

DETAILED DESCRIPTION OF THE EXEMPLARY EMBODIMENTS

Figure 1:
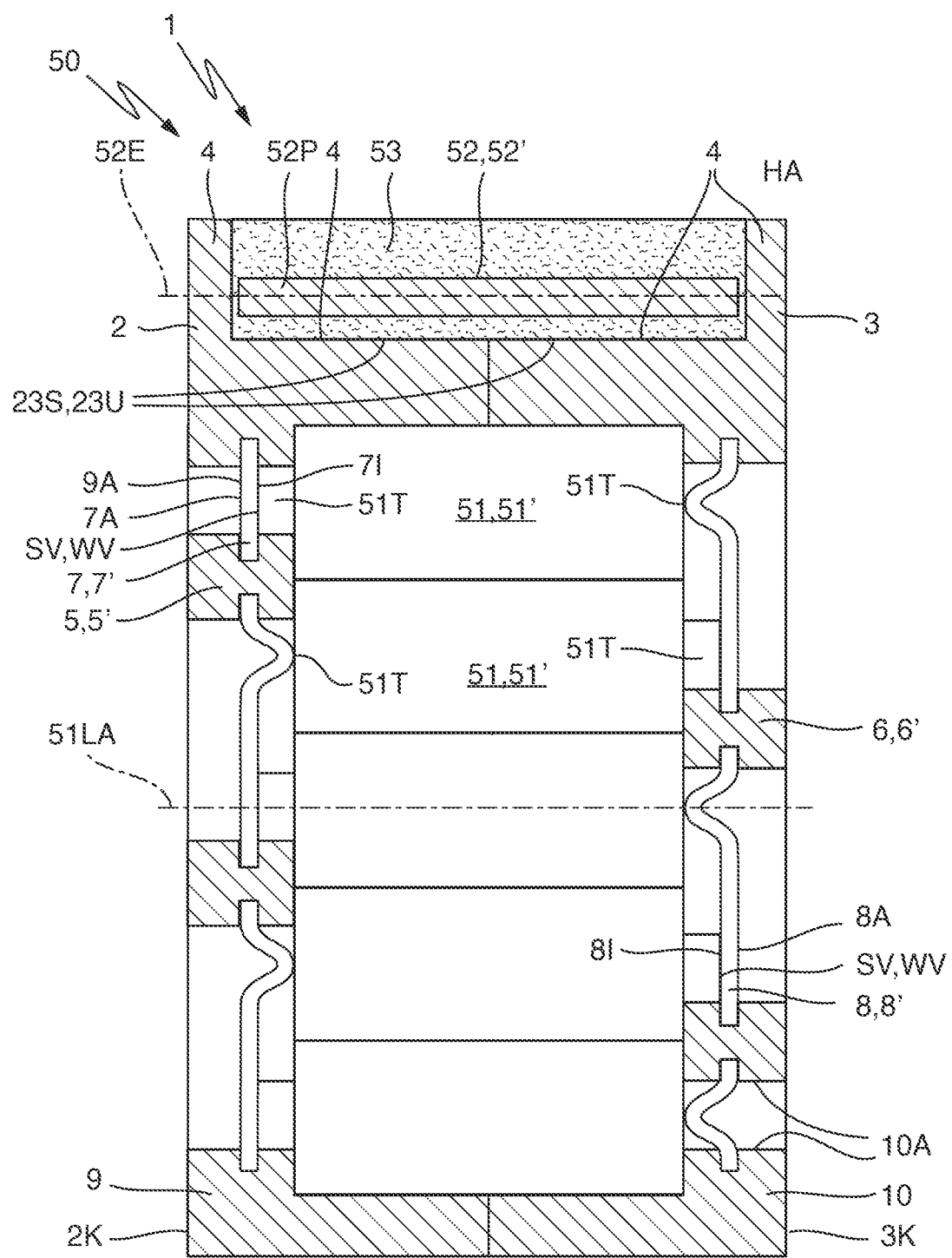
FIG. 1 shows a longitudinal sectional view of a battery pack according to an embodiment of the invention having a structure according to an embodiment of the invention and battery cells and a method according to an embodiment of the invention for producing the battery pack.
Figure 2:
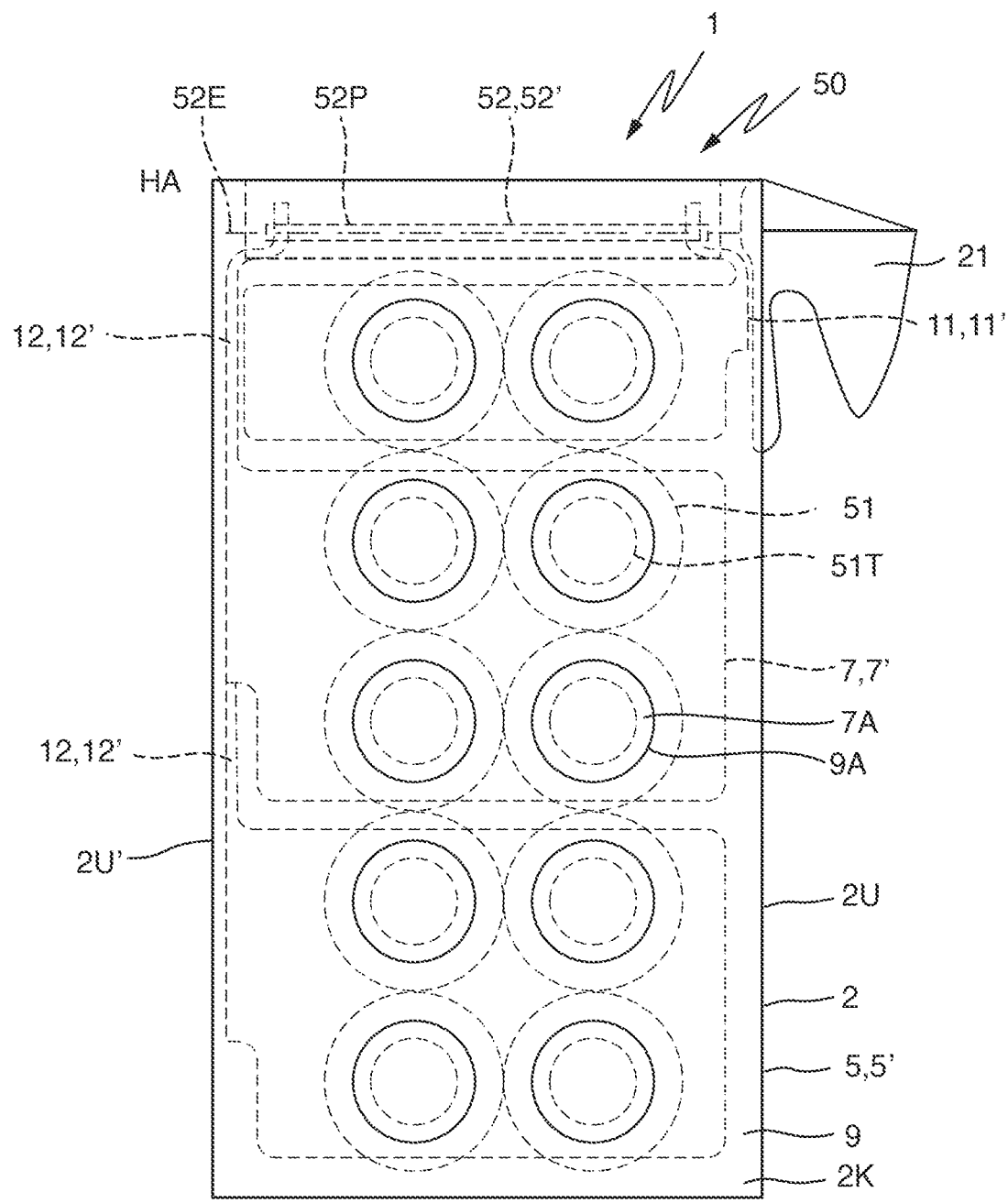
FIG. 2 shows a plan view of the battery pack having the structure and the battery cells of FIG. 1, said view being directed onto an end side of the battery cells and of the method of FIG. 1.
Figure 3:
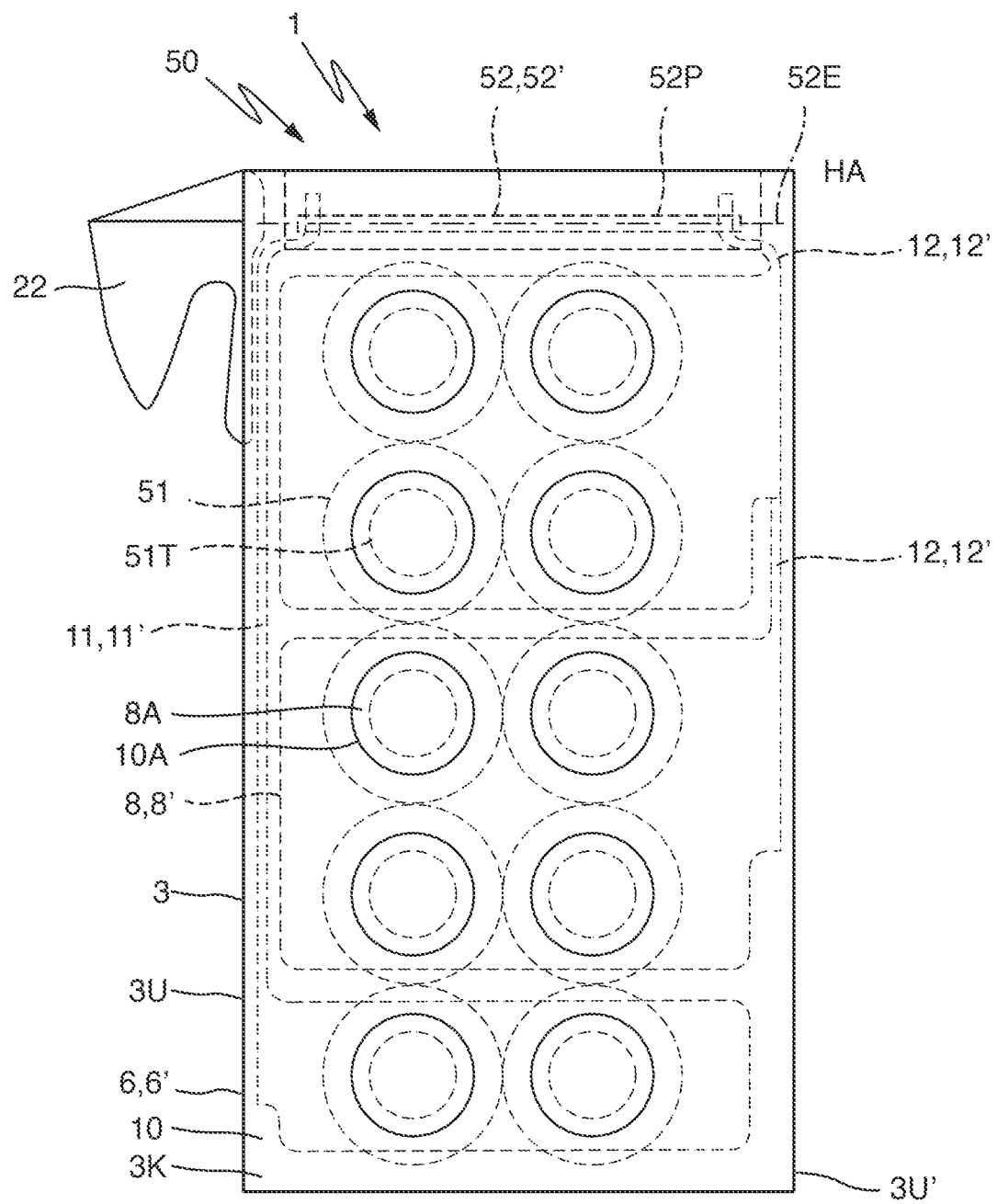
FIG. 3 shows a further plan view of the battery pack having the structure and the battery cells of FIG. 1, said view being directed onto an oppositely situated end side of the battery cells and of the method of FIG. 1.

FIGS. 1 to 3 show a battery pack 50 for supplying an electrically driven work appliance 110 with electrical drive power AL and a method for producing the battery pack 50.

The battery pack 50 has a structure 1 and battery cells 51.

In the exemplary embodiment shown, the battery pack 50 has ten battery cells 51. In alternative exemplary embodiments, the battery pack may have at least two, in particular at least five, in particular more than ten, in particular at least twenty, battery cells.

The structure 1 for the battery pack 50 for supplying the electrically driven work appliance 110 with electrical drive power AL has a number of cell holder parts 2, 3. The number of cell holder parts 2, 3 is designed for holding the battery cells 51.

Additionally, the number of cell holder parts 2, 3 has at least, in the exemplary embodiment shown exactly, two cell holder parts 2, 3. At least two of the, in the exemplary embodiment shown, cell holder parts 2, 3 are designed for arrangement together in a holding arrangement HA and, in the holding arrangement HA, for jointly holding the battery cells 51. The cell holder parts 2, 3, in the holding arrangement HA, jointly form at least a predominant part of a filling mould 4, in the exemplary embodiment shown the entirety of the filling mould 4. The filling mould 4 is designed for filling with a protective material 53 for enclosing at least a part of a battery pack electronics unit 52, in the exemplary embodiment shown of the entire battery pack electronics unit 52.

Additionally, in the exemplary embodiment shown and alternatively in alternative exemplary embodiments, the structure 1 has at least one cast assembly 5, 6, in the exemplary embodiment shown two cast assemblies 5, 6. The in particular respective cast assembly 5, 6 unites one of the number of cell holder parts 2, 3 and at least one casted-in cell contactor 7, 8, and in the exemplary embodiment shown is designed for arrangement in the holding arrangement HA, which in particular need not or may not be the case in alternative exemplary embodiments. The cell contactor 7, 8 is designed for contacting at least one cell terminal 51T of at least one of the held battery cells 51.

In the exemplary embodiment shown, the in particular respective cast assembly 5, 6 unites three casted-in cell contactors 7, 8. In alternative exemplary embodiments, the in particular respective cast assembly may unite only a single casted-in, two or at least four casted-in cell contactors.

Furthermore, in the exemplary embodiment shown, the in particular respective cell contactor 7, 8 is designed for contacting two or four cell terminals 51T of two or four of the held battery cells 51. In alternative exemplary embodiments, the in particular respective cell contactor may be designed for contacting only a single cell terminal only of a single one of the held battery cells or three or at least five cell terminals of three or at least five of the held battery cells.

In particular, the battery cells 51 are held by means of the number of cell holder parts 2, 3, in the exemplary embodiment shown are received between the cell holder parts 2, 3.

Additionally, the structure 1 has the battery pack electronics unit 52 and the protective material 53. The protective material 53 is filled into the filling mould 4 formed at least predominantly by means of the cell holder parts 2, 3 in the holding arrangement HA jointly. The filled protective material 53 encloses the at least one part of the battery pack electronics unit 52.

The method comprises the steps: arranging the cell holder parts 2, 3 together in the holding arrangement HA for jointly holding the battery cells 51, and filling the protective material 53 into the filling mould 4, at least predominantly formed by means of the cell holder parts 2, 3 in the holding arrangement HA jointly, in order to enclose at least the part of the battery pack electronics unit 52.

Additionally, in the exemplary embodiment shown and alternatively in alternative exemplary embodiments, the at least one cell terminal 51T of the at least one of the held battery cells 51 is contacted by means of the casted-in cell contactor 7, 8 of the cast assembly 5, 6 uniting one of the number of cell holder parts 2, 3 and the at least one casted-in cell contactor 7, 8, in the exemplary embodiment shown by means of a cohesive connection SV, in particular a welded connection WV.

The method comprises the steps: producing the at least one cast assembly 5, 6, and contacting the at least one cell terminal 51T of the at least one of the held battery cells 51 by means of the casted-in cell contactor 7, 8 of the cast assembly 5, 6 uniting one of the number of cell holder parts 2, 3 and the at least one casted-in cell contactor 7, 8.

In detail, the cell holder parts 2, 3 are designed, in particular arranged, for arrangement in an arrangement direction z.

Additionally, the cell holder parts 2, 3 are designed, in particular held, for holding elongate battery cells 51' with cell longitudinal axes 51LA non-orthogonally, in the exemplary embodiment shown parallel, with respect to the arrangement direction z.

In the exemplary embodiment shown, the in particular elongate battery cells 51, 51' have, in particular in each case, two cell terminals 51T, in particular at end sides which are situated oppositely, in particular in the arrangement direction z or along the cell longitudinal axis 51LA.

Furthermore, the filling mould 4 is designed for receiving, and in particular receives, at least a part of the battery pack electronics unit 52, in the exemplary embodiment shown the entire battery pack electronics unit 52, and for the filling of, and in particular is filled with, the protective material 51 in a receiving and filling direction x which is non-parallel, in the exemplary embodiment shown orthogonal, with respect to the arrangement direction z.

Furthermore, the filling mould 4 is designed for receiving, and in particular receives, the at least one part of the battery pack electronics unit 52 having at least, in the exemplary embodiment shown exactly, one circuit board 52P with a board plane 52E non-orthogonally, in the exemplary embodiment shown parallel, with respect to the arrangement direction z, and in particular non-parallel, in the exemplary embodiment shown orthogonally, with respect to the receiving and filling direction x.

Additionally, in the exemplary embodiment shown and alternatively in alternative exemplary embodiments, the filling mould 4 is designed for receiving, in particular receives, the at least one part of the battery pack electronics unit 52 having the at least one circuit board 52P with the board plane 52E non-orthogonally, in the exemplary embodiment shown parallel, with respect to a side 23S, in particular a peripheral side 23U, of at least one of the cell holder parts 2, 3.

Furthermore, at least one of the cell holder parts 2, 3, in the exemplary embodiment shown the cast assembly 5, 6, has a contacting side 2K, 3K for the contacting of the at least one cell terminal 51T of the at least one of the held battery cells 51, in particular by means of the cell contactor 7, 8. The cell holder parts 2, 3 jointly have at least the peripheral side 23U which differs from the contacting side 2K, 3K. The filling mould 4 is arranged at the peripheral side 23U.

Furthermore, the in particular respective cast assembly 5, 6 has a cast element 9, 10.

Additionally, the in particular respective cast element 9, 10 has the cell holder part 2, 3 and encloses the cell contactor 7, 8 and has at least one cutout 9A, 10A, in the exemplary embodiment shown ten cutouts 9A, 10A or a multiplicity of cutouts 9A, 10A corresponding, in particular equal, to the multiplicity of battery cells 51. The cutout 9A, 10A leaves free a part of an outer side 7A, 8A and a part of an inner side 71, 81, which is situated opposite the outer side 7A, 8A, in the exemplary embodiment shown in the arrangement direction z, of the cell contactor 7, 8 for the purposes of producing the cohesive connection SV, in particular the welded connection WV, to the cell terminal 51T for the contacting of the cell terminal 51T.

Furthermore, the in particular respective cast assembly 5, 6 has at least one casted-in electrical line 11, 12. The in particular respective line 11, 12 is designed for electrically connecting, in particular electrically connects, the cell contactor 7, 8 to the battery pack electronics unit 52.

In the exemplary embodiment shown, the in particular respective cast assembly 5, 6 has, in particular only, one, in particular single, line 11 in the form of a power line. Additionally, in the exemplary embodiment shown and alternatively in alternative exemplary embodiments, the in particular respective cast assembly 5, 6 has at least one line 12 in the form of a measurement line, in the exemplary embodiment shown at least two lines 12 in the form of measurement lines.

In detail, the in particular respective cell contactor 7, 8 is arranged on the contacting side 2K, 3K of the cell holder part 2, 3. The in particular respective line 11, 12 runs at least in certain sections, in the exemplary embodiment shown entirely, along a peripheral side 2U, 2U', 3U, 3U', which differs from the contacting side 2K, 3K and in the exemplary embodiment shown from the peripheral side 23U, of the cell holder part 2, 3, in the exemplary embodiment shown from the cell contactor 7, 8 to the battery pack electronics unit 52 and/or in the receiving and filling direction x.

In the exemplary embodiment shown, the line 11 in the form of the power line and the, in particular two, lines 12 in the form of measurement lines are spatially separated from one another and from the cell contactors 7, 8, in particular to a maximum possible extent. In other words: the line 11 runs at least in certain sections along one peripheral side 2U, 3U and the line 12 runs at least in certain sections along the other or different, in particular oppositely situated, peripheral side 2U', 3U'.

Furthermore, the in particular respective cell contactor 7, 8 is rigid. In the exemplary embodiment shown, the in particular respective cell contactor 7, 8 has a metal sheet 7', 8', in particular is the metal sheet 7', 8'.

Additionally, in the exemplary embodiment shown and alternatively in alternative exemplary embodiments, the in particular respective line 11, 12 is rigid. In the exemplary embodiment shown, the in particular respective line 11, 12 has a metal sheet 11', 12', in particular is the metal sheet 11', 12'.

In the exemplary embodiment shown, the at least one casted-in electrical line 11, 12, in particular rigid or in the form of the metal sheet 11', 12', is led out of the cast assembly 5, 6, in particular the cast element 9, 10, and is led in particular into the filling mould 4, in particular for the in particular electrical contacting of the battery pack electronics unit 52.

Additionally, in the exemplary embodiment shown and alternatively in alternative exemplary embodiments, the in particular respective cast assembly 5, 6 unites at least one casted-in pack contactor 21, 22. The pack contactor 21, 22 is designed for contacting at least one appliance contactor of the work appliance 110.

In the exemplary embodiment shown, the in particular respective cast assembly 5, 6 unites only a single casted-in pack contactor 21, 22. In alternative exemplary embodiments, the in particular respective cast assembly may unite at least two casted-in pack contactors.

Further additionally, in the exemplary embodiment shown and alternatively in alternative exemplary embodiments, the in particular respective cast element 9, 10 has the cell holder part 2, 3 and encloses the cell contactor 7, 8 and is in itself inter face-free.

Furthermore, the in particular respective cast assembly 5, 6 is an injection-moulded assembly 5', 6'. The in particular respective cell contactor 7, 8 is injection-moulded.

In alternative exemplary embodiments, the cast assembly, in particular the cast element, if present, may be and/or have been manufactured additively or by means of 3D printing. In examples which do not conform to the invention, an assembly or an element, if present, need not or may not be a cast assembly or a cast element. In particular, the assembly, in particular the element, if present, may be and/or have been manufactured additively or by means of 3D printing.

Furthermore, the battery pack electronics unit 52 has a measurement, power, user interface and/or transmission electronics unit 52', in particular is the measurement, power, user interface and/or transmission electronics unit 52'.

Figure 4:
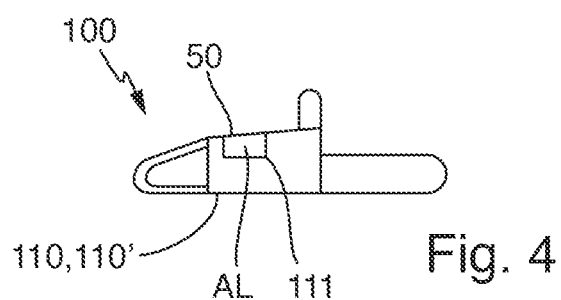
FIG. 4 shows a perspective view of a work system according to an embodiment of the invention having the battery pack of FIG. 1 and an electrically driven work appliance.

FIG. 4 shows a work system 100. The work system 100 has the battery pack 50 and the electrically driven work appliance 110. The battery pack 50 and the work appliance 110 are designed for electrical connection, in particular are electrically connected, to one another, in particular by mutual contacting of the at least one pack contactor 21, 22 and of the at least one appliance contactor, for the purposes of supplying the work appliance 110 with electrical drive power AL from the battery pack 50.

In detail, the work appliance 110 has a battery receptacle 111. The battery receptacle 111 is designed for receiving the battery pack 50, and the battery pack 50 is in particular received.

In the exemplary embodiment shown, the work appliance 110 is a saw 110'. In alternative exemplary embodiments, the work appliance may be a pole pruner, a brushcutter, a hedge trimmer, a hedge cutter, a blower, a leaf blower, a pruner, an angle grinder, a sweeping appliance, a sweeping roller, a sweeping brush, a lawnmower, an aerator or a grass trimmer.

In examples which do not conform to the invention, a mould need not or may not be a filling mould, or the mould need not or may not be designed for filling with a protective material. In particular, the mould may be designed for receiving at least a part of the battery pack electronics unit, in particular the entire battery pack electronics unit. Additionally or alternatively, a, in particular the, structure may have a cover, wherein the cover may be designed for sealingly closing the mould, in particular with the received battery pack electronics unit. In particular, the mould, in particular with the received battery pack electronics unit, may be sealingly closed by means of the cover.

As is made clear by the exemplary embodiments shown and discussed above, the invention provides an advantageous structure for a battery pack for supplying an electrically driven work appliance with electrical drive power, an advantageous battery pack, which has such a structure, for supplying an electrically driven work appliance with electrical drive power, an advantageous work system having such a battery pack and an electrically driven work appliance, and an advantageous method for producing such a battery pack, wherein the method and the structure and thus the battery pack and thus the work system each have improved characteristics.

The invention claimed is:

1. A structure for a battery pack for supplying an electrically driven work appliance with electrical drive power, the structure comprising:
a number of cell holder parts, wherein the number of cell holder parts is designed for holding battery cells, wherein
the number of cell holder parts comprises at least two cell holder parts,
at least two of the cell holder parts are designed for arrangement together in a holding arrangement and, in the holding arrangement, for jointly holding the battery cells,
the cell holder parts, in the holding arrangement, jointly form at least a predominant part of a filling mould,
the filling mould is designed for filling with a protective material for enclosing at least a part of a battery pack electronics unit, and
the structure has at least one cast assembly, wherein the cast assembly unites one of the number of cell holder parts and at least one casted-in cell contactor, wherein the cell contactor is designed for contacting at least one cell terminal of at least one of the held battery cells.

2. The structure according to claim 1,
wherein the cell holder parts are designed for arrangement in an arrangement direction and for holding elongate battery cells with cell longitudinal axes that are not orthogonal with respect to the arrangement direction.

3. The structure according to claim 1, wherein at least one of:
the cell holder parts are designed for arrangement in an arrangement direction, and wherein the filling mould is designed for receiving at least a part of the battery pack electronics unit, and for filling with the protective material, in a receiving and filling direction which is non-parallel with respect to the arrangement direction,
the cell holder parts are designed for arrangement in an arrangement direction, and wherein the filling mould is designed for receiving at least a part of the battery pack electronics unit having at least one circuit board with a board plane that is not orthogonal with respect to the arrangement direction, or
the filling mould is designed for receiving at least a part of the battery pack electronics unit having at least one circuit board with a board plane that is not orthogonal with respect to a peripheral side of at least one of the cell holder parts.

4. The structure according to claim 1, wherein
at least one of the cell holder parts has a contacting side for contacting of at least one cell terminal of at least one of the held battery cells, and
the cell holder parts jointly have at least one peripheral side which differs from the contacting side, wherein the filling mould is arranged at the peripheral side.

5. The structure according to claim 1, wherein
the cast assembly has a cast element,
the cast element has the one of the number of cell holder parts and encloses the cell contactor and has at least one cutout,
the cutout leaves free a part of an outer side and a part of an inner side, which is situated opposite the outer side, of the cell contactor for producing a cohesive connection to the cell terminal for the contacting of the cell terminal.

6. The structure according to claim 1, wherein
the cast assembly has at least one casted-in electrical line,
the electrical line is designed for electrically connecting the cell contactor to a battery pack electronics unit.

7. The structure according to claim 6, wherein
the cell contactor is arranged at a contacting side of the one of the number of cell holder parts, and
the electrical line runs at least in certain sections along a peripheral side, which differs from the contacting side, of the one of the number of cell holder parts.

8. The structure according to claim 7, wherein
the cell contactor is a metal sheet, and/or
the electrical line is a metal sheet.

9. The structure according to claim 1, wherein
the cast assembly unites at least one casted-in pack contactor,
the pack contactor is designed for contacting at least one appliance contactor of the work appliance.

10. The structure according to claim 1, wherein
the cast assembly has a cast element,
the cast element has the cell holder part and encloses the cell contactor and is in itself inter face-free.

11. The structure according to claim 1, wherein
the cast assembly is an injection-moulded assembly, and
the cell contactor is injection-moulded.

12. A battery pack for supplying an electrically driven work appliance with electrical drive power, the battery pack comprising:
the structure according to claim 1; and
battery cells, wherein the battery cells are held by way of the number of cell holder parts,
wherein
the structure has a battery pack electronics unit and a protective material, wherein the protective material is filled into the filling mould formed at least predominantly by way of the cell holder parts in the holding arrangement jointly, and wherein the filled protective material encloses at least a part of the battery pack electronics unit, and/or
the at least one cell terminal of the at least one of the held battery cells is contacted by way of the casted-in cell contactor of the cast assembly uniting one of the number of cell holder parts and the at least one casted-in cell contactor.

13. The battery pack according to claim 12,
wherein the battery pack electronics unit is a measurement, power, user interface and/or transmission electronics unit.

14. A work system, comprising:
the battery pack according to claim 12;
an electrically driven work appliance,
wherein the battery pack and the work appliance are designed for electrical connection to one another for supplying the work appliance with electrical drive power from the battery pack.

15. A method for producing a battery pack, the method comprising the steps of:
arranging a number of cell holder parts together in a holding arrangement for jointly holding the battery cells, and filling a protective material into the filling mould, at least predominantly formed via the cell holder parts in the holding arrangement jointly, in order to enclose at least part of a battery pack electronics unit, and
producing at least one cast assembly, holding the battery cells via the number of cell holder parts, and contacting the at least one cell terminal of the at least one of the held battery cells by way of a casted-in cell contactor of the cast assembly uniting one of the number of cell holder parts and the at least one casted-in cell contactor.

16. A structure for a battery pack for supplying an electrically driven work appliance with electrical drive power, the structure comprising:
a number of cell holder parts, wherein the number of cell holder parts is designed for holding battery cells,
wherein
the structure has at least one cast assembly, wherein the cast assembly unites one of the number of cell holder parts and at least one casted-in cell contactor, wherein the cell contactor is designed for contacting at least one cell terminal of at least one of the held battery cells,
wherein
the cast assembly has at least one casted-in electrical line, the line is designed for electrically connecting the cell contactor to a battery pack electronics unit,
wherein
the cell contactor is arranged at a contacting side of the cell holder part, and the line runs at least on certain sections along a peripheral side, which differs from the contacting side, of the cell holder part.

17. A battery pack, for supplying an electrically driven work appliance with electrical drive power, the battery pack comprising:
a structure for the battery pack for supplying the electrically driven work appliance with the electrical drive power, the structure comprising:
a number of cell holder parts, wherein the number of cell holder parts is designed for holding battery cells,
wherein
the structure has at least one cast assembly, wherein the cast assembly unites one of the number of cell holder parts and at least one casted-in cell contactor, wherein the cell contactor is designed for contacting at least one cell terminal of at least one of the held battery cells,
wherein
the cast assembly has a cast element, the cast element has the cell holder part and encloses the cell contactor and has at least one cutout, the cutout leaves free a part of an outer side and a part of an inner side, which is situated opposite the outer side, of the cell contactor for producing a welded connection to the cell terminal for the contacting of the cell terminal; and battery cells, wherein the battery cells are held by way of the number of cell holder parts,
wherein
at least one cell terminal of at least one of the held battery cells is contacted by way of the casted-in cell contactor of the cast assembly uniting one of the number of cell holder parts and the at least one casted-in cell contactor by way of the welded connection.

* * * * *